Figure 1:
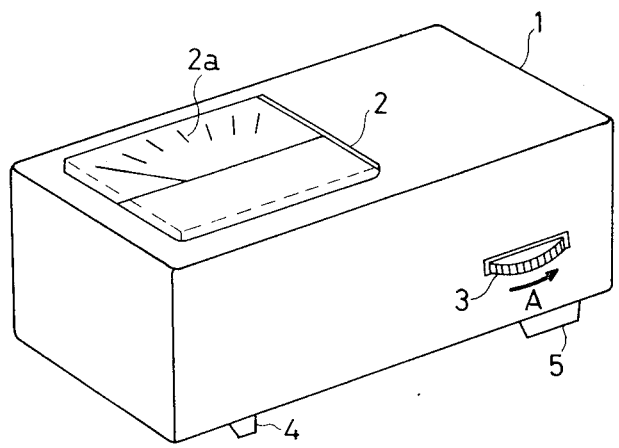

United States Patent [19]
Abe

[11] 3,814,523
[45] June 4, 1974

[54] PHOTO-ELECTRIC DENSITOMETER
[75] Inventor: Toshio Abe, Tokyo, Japan
[73] Assignee: Konishiroku Photo Industry Co., Ltd., Tokyo, Japan
[22] Filed: July 7, 1972
[21] Appl. No.: 269,559

Related U.S. Application Data
[63] Continuation of Ser. No. 101,065, Dec. 23, 1970, abandoned.

[52] U.S. Cl............... 356/202, 356/209, 356/212
[51] Int. Cl. .......................................... G01n 21/48
[58] Field of Search .......................... 356/201–206, 356/209–212

[56] References Cited
UNITED STATES PATENTS
3,246,334   4/1966   Devereaux .......................... 356/203
3,512,894   5/1970   Wood ................................. 356/209
3,535,046   10/1970   Denner ............................... 356/212

OTHER PUBLICATIONS
Joscheck; "Lichtelektrischer Reflexionsmesser," Siemens Zeitschrift Mai/Juni 1933, pages 110–112

Primary Examiner—Ronald L. Wibert
Assistant Examiner—F. L. Evans
Attorney, Agent, or Firm—Bierman & Bierman

[57] ABSTRACT

An improved portable type of photo-electric densitometer, which contains a photometer section as well as display means within its main body, and in which one of the legs of the main body is provided with a light inlet opening which functions, when said densitometer is placed on a sheet carrying an image thereon, as an optical path for leading the light transmitted through the sheet portion beneath said particular one leg to a photo-electric element in said photometer section to give a direct reading of the image density at said sheet portion on said display means.

1 Claim, 4 Drawing Figures

PHOTO-ELECTRIC DENSITOMETER

This is a continuation of application Ser. No. 101,065, filed Dec. 23, 1970, now abandoned, which is based on Japanese application Ser. No. 123847/1969, filed Dec. 29, 1969.

The present invention relates to a portable type of photo-electric densitometer for measuring a density of black-and-white pictures by transmission.

The densitometers in the prior art had disadvantages that the body of the instrument was large and that upon densitometry complex operations were required.

The present invention has it as an object to provide a portable type of photo-electric densitometer, which is compact in size and simple in operation, in view of the aforementioned disadvantages in the prior art.

The densitometer according to the present invention also has an advantage that since one of the legs is utilized as a light inlet path for the photometer section, a tight contact between the boundary wall of the light inlet path and the sheet to be measured is assured and thus no external light can invade into the light inlet path.

In addition, the present invention affords another advantage that the scale of the display means is graduated substantially at equal intervals to give a direct reading of the density value.

Figure 2:
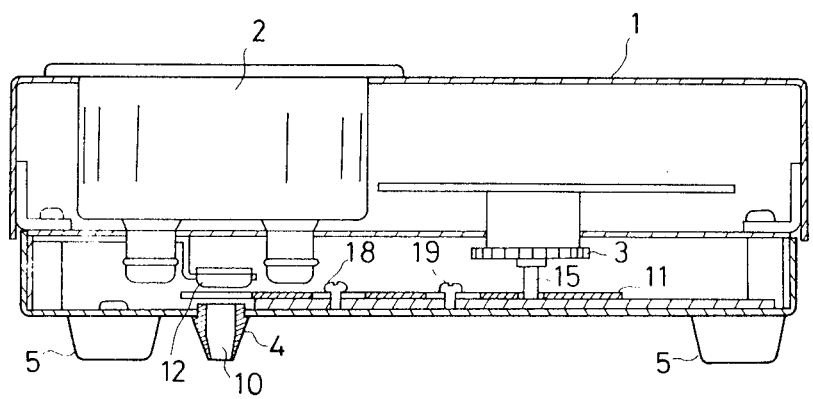
Figure 3:
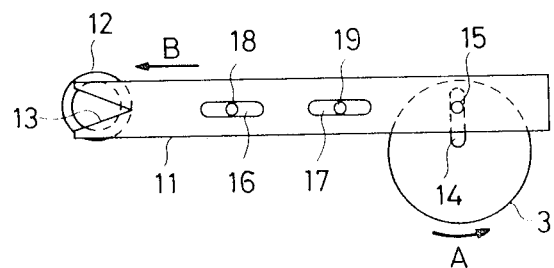
Figure 4:
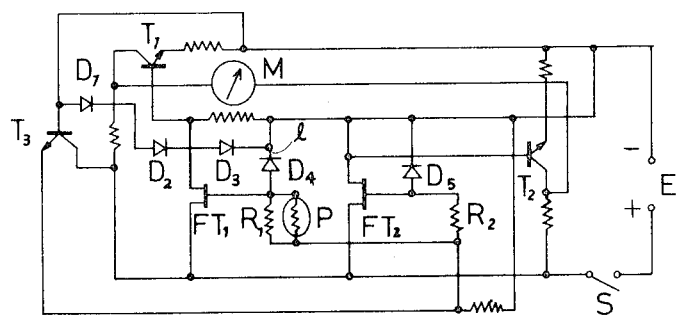

Now the present invention will be described with reference to its preferred embodiment illustrated in the accompanying drawings, wherein:

FIG. 1 is a perspective view of one preferred embodiment of the present invention, FIG. 2 is a cross-section view of the same embodiment in FIG. 1, FIG. 3 is an enlarged view of a light receiver section in the same embodiment, and FIG. 4 is a circuit diagram of the same embodiment.

Referring now to the drawings, the instrument body 1 is provided with a meter 2 including a density scale 2a, a zero adjust knob 3 of the meter 2, and legs 4 and 5, 5 . . . . . The leg 4 also serves as a photometer section as described later.

In the followings, the respective sections of this photo-electric densitometer will be described for each item:

PHOTOMETER SECTION:

The leg 4 is provided with a light inlet opening 10. Above the light inlet opening 10 are disposed a slide plate 11 having an aperture slit 13 and a light receiver section 12 consisting of a photo-electric element such as, for example, a cadmium sulfide element.

ZERO ADJUST MECHANISM FOR METER:

The zero adjust knob 3 is pivotably mounted on the body 1, and is provided with an elongated opening 14.

The slide plate 11 is provided with a pin 15 fitting into the elongated opening 14, elongated openings 16 and 17, and the aperture slit 13. Into the elongated openings 16 and 17 are fitted pins 18 and 19, respectively, provided on the body 1.

When the zero adjust knob 3 is turned in the direction shown by an arrow A, the slide plate 11 slides in the direction shown by an arrow B, and vice versa, as being guided by means of the elongated openings 16 and 17 as well as the pins 18 and 19, so that the aperture slit 13 may change the amount of incident light to the light receiver section 12. Since the pointer of the meter 2 swings as the amount of incident light to the light receiver section 12 is changed, it is possible to preset the pointer of the meter at the zero point by turning the zero adjust knob 3 while watching the meter 2.

ELECTRIC CIRCUIT:

In FIG. 4, reference P indicates a photo-electric element as of cadmium sulfide which forms the light receiver section 12 as in FIG. 2, reference E indicates power supply to terminals, reference S indicates a switch, $FT_1$ and $FT_2$ indicate field effect transistors, respectively, $T_1$ and $T_2$ indicate amplifier transistors, $T_3$ indicates a power supply stablizing transistor, M indicates a meter corresponding to the meter 2 in FIG. 1, and $D_1$, $D_2$ and $D_3$ indicate diodes, respectively. Reference $R_1$ indicates a resistor connected in parallel to the photo-electric element P, and it is provided for the purpose of flowing a certain amount of electric current through a network 1 even if the amount of incident light to the photo-electric element P is small and thus said element shows a high resistance, to apply a voltage to the gate of the field effect transistor $FT_1$. Reference $R_2$ indicates a resistor having substantially the same resistance as the resistor $R_1$. Reference $D_4$ indicates a non-linear element such as a diode, which is an element for producing a voltage varying logarithmically with respect to the change of the electric current flowing through said element. Reference $D_5$ is also a non-linear element having the same function as element $D_4$. The resistor $R_2$, non-linear element $D_5$, field effect transistor $FT_2$ and transistor $T_2$ form a reference network in contrast to the photometric network consisting of the photo-electric element P, resistor $R_1$, non-linear element $D_4$, field effect transistor $FT_1$ and transistor $T_1$.

When a light is projected to the photo-electric element P under the state of closing the switch S, an electric current substantially in proportion to the amount of incident light flows through the non-linear element $D_4$, and due to this electric current a voltage proportional to the logarithm of this current value is produced across the non-linear element $D_4$. That is, since the gate of the field effect transistor $FT_1$ is applied with a potential proportional to the logarithm of the intensity of incident light, an electric current proportional to the logarithm of the intensity of incident light flows through the output circuit of the field effect transistor $FT_1$.

On the other hand, through the meter M flows a difference current between the current from the aforementioned reference network and the abovementioned photometric network. Therefore, the value indicated by the meter M is the logarithm of the intensity of incident light to the photo-conductive element P. In case that the incident light to the photo-conductive element P is the light transmitted through a light transparent sheet, then the value indicated by the meter directly represents the image density, and obviously the scale of the meter M is graduated substantially at equal intervals.

Now the operation of this photo-electric densitometer will be described. At first, the instrument body is placed on a transparent glass plate (in the case of a parallel light photographic densitometry) or on a light scattering plate (in the case of a scattered light densitometry), the switch S is closed (the switch S is preferably closed by the actuation of the zero adjust knob 3), the zero adjust knob 3 is turned, the slide plate 11 is made to slide to adjust the amount of incident light to the light receiver section 12, and the pointer of the meter is preset at the zero point. Subsequently, a transparent sheet is placed on the transparent plate or the light scattering plate, then the instrument body 1 is placed on said transparent sheet while registering the leg 4 with the portion of the sheet whose density is to be measured, and the value indicated by the meter is read out.

In summary, according to the present invention, owing to the fact that the photo-electric densitometer is formed in an overplace type and utilizes its one leg as a part of the photometer section, only by placing the photo-electric densitometer on the transparent sheet to be measured, a harmful light can be entirely shut out and also the image density can be measured while maintaining the distance between the sheet and the light receiver section always at an exactly constant value, and therefore, an accurate densitometry can be achieved with a simple operation. Furthermore, since a photo-electric element is employed as the light receiver element for constructing the light receiver section and the output response of the photo-electric element is logarithmically converted to represent the image density directly with a uniform scale, the subject invention has practically excellent features that the instrument body is made extremely compact, and that a density indication which is easy to be read out and accurate, can be obtained.

What is claimed is:

1. A photoelectric densitometer for placement on a sheet carrying an image thereon for measuring its density and which utilizes a light source, said photoelectric densitometer comprising at least three legs for steadying said densitometer, and a photometer section, at least one of said legs having a single opening therein for permitting light to enter said one leg said one leg being positioned on said sheet to prevent stray light from entering the densitometer, said one leg serving also as a part of the photometer section, said photometer section comprising a photoelectric element having an output responsive to the light falling thereon and being mounted so as to receive the light entering through said one leg, amplifier means for logarithmically converting and amplifying the output response signal from said photoelectric element, a meter connected to the output circuit of said amplifier means and having a uniform image density scale, zero point adjust means for said meter, and compensating circuitry for obtaining a difference signal between the logarithmically converted output signal and a reference signal.

* * * * *